United States Patent [19]
Campbell

[11] Patent Number: 5,158,143
[45] Date of Patent: Oct. 27, 1992

[54] RIBBED HORSESHOE

[76] Inventor: Robert S. Campbell, 4051 W. Sterling, Jonesville, Mich. 49250

[21] Appl. No.: 713,413

[22] Filed: Jun. 10, 1991

[51] Int. Cl.$^5$ .................................................. A01L 1/02
[52] U.S. Cl. ............................................ 168/4; 168/29
[58] Field of Search ................................. 168/4, 29, 24

[56]  References Cited

U.S. PATENT DOCUMENTS

| D. 26,834 | 3/1897 | Singerly | 168/29 |
| 295,616 | 3/1884 | Caspari . | |
| 787,097 | 4/1905 | Heart . | |
| 895,367 | 8/1908 | Harden . | |
| 1,040,958 | 10/1912 | Ketterer | 168/4 |
| 2,679,906 | 6/1954 | McGraw et al. | 168/24 |
| 3,340,933 | 9/1967 | McGraw et al. | 168/24 |

FOREIGN PATENT DOCUMENTS

| 8808666 | 11/1988 | PCT Int'l Appl. | 168/4 |
| 22885 | 7/1902 | Switzerland | 168/29 |
| 23467 | of 1897 | United Kingdom | 168/29 |
| 278873 | 10/1927 | United Kingdom | 168/29 |

Primary Examiner—Robert P. Swiatek
Attorney, Agent, or Firm—Beaman & Beaman

[57]  ABSTRACT

A lightweight horseshoe particularly suitable for competitive events requiring high maneuverability, the horseshoe including a body having a plurality of sharp ribs extending from the shoe ground engaging face. Four ribs are employed across the shoe body width, the front rib constituting a deeper penetrating grab. The ribs are configured to be self-cleaning, and the shoe includes homogeneous reinforcing bars to resist outward shoe deformation under lateral stress. The reinforcing bars intersect the shoe outer and inner sides, and clearance slots formed in the shoe outer side adjacent the reinforcing bars facilitates the self-cleaning of the shoe adjacent the bars.

5 Claims, 1 Drawing Sheet

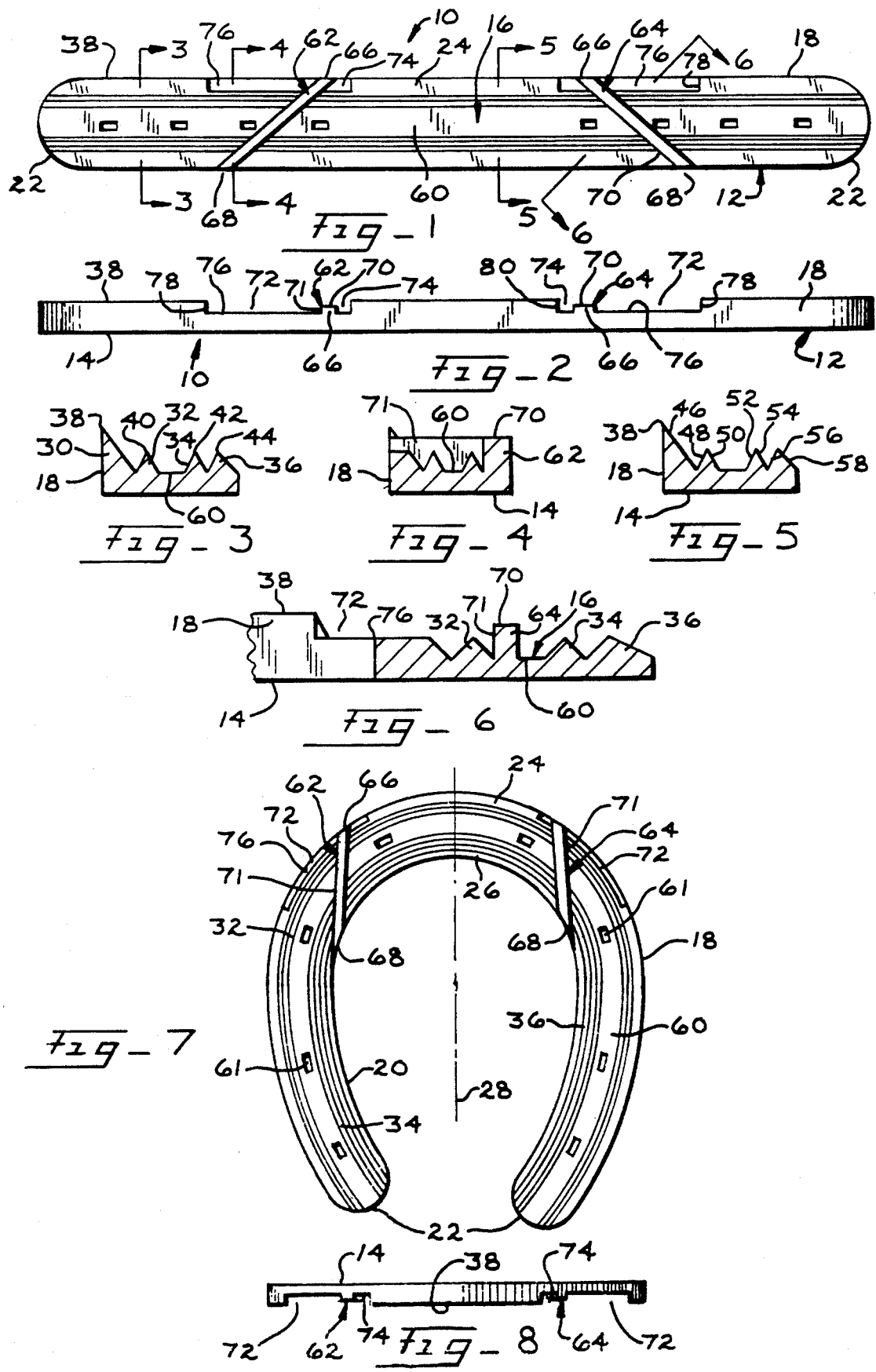

RIBBED HORSESHOE

FIELD OF THE INVENTION

The invention pertains to lightweight, high-traction and self-cleaning horseshoes which provide excellent horse maneuverability and are particularly suitable for barrel racing, jumping, and similar competitive events requiring secure footing under variable terrain conditions.

DESCRIPTION OF THE RELATED ART

Conventional horseshoes utilize a relatively flat hoof engaging face which is nailed to the horse's hoof, and the ground engaging face of the horseshoe is of a generally convex configuration. Over the years horseshoe constructions have been proposed for improving the traction of the horse by forming ridges or protrusions which extend from the ground engaging face to penetrate the ground and improve the frictional resistance between the ground and the horse's shoed foot. Examples of previously proposed horseshoe constructions are found in U.S. Pat. Nos. DES 26,834; 295,616; 787,097; 895,367; 2,679,906 and 3,340,933. Patents such as those listed above disclose horseshoes having ridges or projections for increasing shoe friction with the ground surface, however, such shoes as those disclosed in the prior art have not enjoyed popularity among present day horse owners and equestrian event competitors.

With present day equestrian competitive events, such as barrel racing, it is important that the horseshoes be light, and capable of providing excellent traction while taking tight turns at high speeds. Prior art horseshoes are usually too heavy for present day requirements, and because competitive events take place on a wide variety of ground types, such as sand, hard packed soil, loose dirt, clay impregnated soil, and the like, the self-cleaning aspects of prior art horseshoes have not met present day requirements.

A further problem with horseshoes which are relatively lightweight due to minimizing the dimensions of the horseshoe, i.e. the vertical thickness and width, such horseshoes do not have the strength to resist the stresses imposed thereon when the horse takes a tight turn under gallop, such as occurs during barrel racing. The lateral stresses imposed upon the horseshoe cause the shoe to "open" or "spread" often tearing the hoof and injuring the animal.

OBJECTS OF THE INVENTION

It is an object of the invention to provide a lightweight, high traction and self-cleaning horseshoe which is economical to manufacture and may be nailed upon a horse using conventional shoeing techniques.

Another object of the invention is to provide a lightweight horseshoe which has sufficient strength to resist deformation under lateral forces such as those encountered in barrel racing and the like.

Yet another object of the invention is to provide a lightweight, self-cleaning, high traction horseshoe which cleans itself of accumulated soil, dirt, sawdust, and the like, and permit the sharp edges of the shoe required for improved traction to be accessible to the engaged ground.

Yet a further object of the invention is to provide a lightweight, high traction, self-cleaning horseshoe which utilizes four ribs for increased traction purposes, the ribs being formed by converging surfaces defining included angles which permit self-cleaning, and the horseshoe is strengthened by homogeneous reinforcing bars intersecting the ribs which prevent spreading of the horseshoe due to lateral forces, and the construction permits the area adjacent the reinforcing bars to self clean.

SUMMARY OF THE INVENTION

In the practice of the invention the horseshoe consists of a steel or aluminum alloy body having hoof engaging and ground engaging faces. The vertical or height spacing between the faces is relatively small, but the shoe body is wider than usual to facilitate "floating" of the shoe and horse upon loose sand and soil.

The ground engaging face of the shoe includes four ribs which extend the length of the shoe and are defined by surfaces which converge to relatively sharp apices to permit the apices to penetrate the ground and provide a relatively high friction. The front rib is formed by the intersection of the shoe body outer side and a converging ground engaging face surface, and this front rib constitutes a "grab" defining the maximum height dimension of the shoe whereby maximum earth penetration occurs at the shoe outer periphery.

The included angle defined by the intersecting and converging surfaces defining the ribs is preferably greater than 50°, and such an angular relationship provides the self-cleaning of dirt received between adjacent ribs. Further, a dividing surface is centrally formed in the ground engaging face intermediate the outer and inner sides which aids in the self-cleaning characteristics, and the nail receiving holes are defined in this dividing surface.

In order to minimize the material used in the horseshoe in order to achieve the desired light weight, and yet provide the horseshoe with sufficient strength to prevent lateral deforming or "opening" of the shoe due to lateral stresses being imposed on the shoe during tight high speed turns a pair of reinforcing bars are homogeneously formed in the horseshoe. The reinforcing bars are defined upon opposite sides of the shoe longitudinal axis and are of a vertical dimension greater than that of the ribs, but slightly less than the vertical dimension of the front grab rib and divide the ground engaging face into three parts. The ribs are substantially parallel to each other, and are so located as to provide the desired mass and strength at the most advantageous location to prevent horseshoe deformation under lateral forces, and yet not add significant weight to the horseshoe.

To render the ground engaging face adjacent the reinforcing bars self-cleaning, slots are formed adjacent the front end of the reinforcing bars which intersect the horseshoe outer side. The slots have a lesser vertical dimension than the reinforcing bars exposing the bars lateral sides, and the presence of the slots permits the shoe to be self-cleaning adjacent the reinforcing bars.

Experimentation has proven that horseshoes constructed in accord with the invention have superior friction and maneuverability characteristics to those horseshoes presently being used, and the self-cleaning aspects due to the particular configuration of the horseshoe has proven to be practical and effective.

BRIEF DESCRIPTION OF THE DRAWINGS

The aforementioned objects and advantages of the invention will be appreciated from the following description and accompanying drawings wherein:

FIG. 1 is a bottom view of a horseshoe blank constructed in accord with the invention prior to the blank being bent into a typical horseshoe configuration, FIG. 2 is a front side elevational view of the formed blank shown in FIG. 1 as taken from the top of FIG. 1, FIG. 3 is an elevational sectional view taken along Section 3—3 of FIG. 1, FIG. 4 is an elevational sectional view taken along Section 4—4 of FIG. 1, FIG. 5 is an elevational sectional view taken along Section 5—5 of FIG. 1, FIG. 6 is an elevational sectional view taken along Section 6—6 of FIG. 1, FIG. 7 is a bottom view of a formed horseshoe in accord with the invention, and FIG. 8 is a front elevational view of the formed horseshoe as taken from the top of FIG. 7.

DESCRIPTION OF THE PREFERRED EMBODIMENTS

FIGS. 1 and 2 illustrate the form of the horseshoe blank 10 prior to being bent into the conventional C shape shown in FIGS. 7 and 8. Typically, horseshoe blanks are forged while in a linear configuration on die sets such as described in U.S. Pat. No. 2,679,906, and it is appreciated that the particular method for forming a horseshoe in accord with the invention should not be construed to limit the inventive concepts. A horseshoe utilizing the inventive concepts may be made by casting techniques as well as forging, swaging, or by other conventional metalworking processes.

The blank 10 is of an elongated linear configuration usually formed of steel, or an aluminum alloy, having excellent wear characteristics. The blank 10 comprises the body 12 which includes a hoof engaging face 14 which is of a generally planar configuration, and remains planar after forming the blank into the finished C shaped configuration. The ground engaging face 16 of the body 12 is oppositely disposed to the face 14, and the body 12 also includes an outer side 18 which becomes the convex front side of the finished horseshoe, and an inner side 20 which becomes the inner or rear side of the finished shoe. The ends 22 of the body 12 are preferably radiused as illustrated.

A front central portion of the blank 10 is defined at 24, and a rear central portion is formed at 26. A line substantially bisecting the portions 24 and 26 defines the horseshoe longitudinal axis 28 represented in FIG. 7.

The primary frictional engagement between the horseshoe and the earth is due to the presence of four ribs 30, 32, 34 and 36, FIG. 3. These ribs extend the length of the body 12, FIG. 1, and are spaced across the width of the ground engaging face 16 between sides 18 and 20. The rib 30 is of the greatest vertical or height dimension and constitutes a "grab" defined at the periphery of the shaped horseshoe. The apices of the ribs 30, 32, 34 and 36 are indicated by numerals 38, 40, 42 and 44, respectively, and as will be appreciated from the drawings the rib apices are sharp for ease of ground and earth penetration.

With particular reference to FIGS. 3-6, the grab rib 30 is defined by the body outer side 18 which intersects the surface 46 at the apex 38. Rib 32 is formed by intersecting converging surfaces 48 and 50, while rib 34 is defined by converging surfaces 52 and 54 and rib 36 is formed by converging and intersecting surfaces 56 and 58. The surfaces 46 and 48, and 54 and 56, intersect to define a valley, and the included angle defined by these intersecting surfaces is, preferably, greater than 50° to facilitate self-cleaning of dirt entering these valleys.

A flat dividing surface 60 is centrally formed between the body sides 18 and 20, and is of a planar configuration parallel to the hoof engaging face 14. The dividing surface 60 separates the ribs 32 and 34, is not prone to trap dirt between these spaced ribs, and a plurality of nail holes 61 extend through the dividing surface 60 for receiving the nails for attaching the horseshoe to the horse's hoof in the known manner.

In order to reduce the weight of the blank 10 the spacing between the faces 14 and 16 is relatively small, and this reduction in mass of the body 12 weakens the strength of the horseshoe body 12 with respect to lateral forces. As the horseshoe body 12 is primarily subjected to the compressive forces resulting from the weight of the horse and rider such compressive forces perpendicular to the plane of the hoof engaging face 14 are not inclined to deform the shoe. However, lateral forces imposed upon the shoe during rapid and tight turns by the horse during barrel racing, for instance, impose such forces as to "open" the C shaped configuration of the horseshoe nailed upon the hoof. To resist such lateral deformation the horseshoe of the invention includes homogeneous reinforcing bars 62 and 64 defined upon the ground engaging face 16.

As will be apparent from FIG. 7, the reinforcing bars 62 and 64 are located upon opposite sides of the longitudinal axis 28, and define the termination of the front central portion 24 and the rear central portion 26. The bars 62 and 64 are obliquely related to each other when the horseshoe is in the form of the blank 10, FIG. 1, in order that the reinforcing bars will be properly related to each other in the finished horseshoe C shaped configuration of FIG. 7.

Each reinforcing bar includes a front end 66 which intersects the body outer or front side 18, and each reinforcing bar includes a rear end 68 which intersects the blank rear or inner side 20. The free or lowermost surface 70 of the reinforcing bars is parallel to the face 14 and the surfaces 70 define the vertical dimension or height of the reinforcing bars. As will be appreciated from FIGS. 2, 4 and 6, the height of the reinforcing bars 62 and 64 is less than the height of the outer sides 18 as defined by the face 18 and the apex 38. The lateral sides of the reinforcing bars are represented at 71.

The oblique angles of the reinforcing bars 62 and 64 as defined upon the blank 10, FIG. 1, are such that when the blank 10 is formed into the C configuration of FIG. 7, the bars 62 and 64 are almost parallel to each other and the longitudinal axis 28. This locating of the mass of the bars 62 and 64 upon opposite sides of the axis 28, and at the region of the horseshoe wherein lateral bending and deformation are most likely to occur, reinforces the formed horseshoe at the most critical locations to prevent the "spreading" or "opening" of the horseshoe and prevents damage from being inflicted upon the horse,s hoof without adding significant mass and weight to the horseshoe.

As the dirt and soil will be forced against the reinforcing bar lateral sides 71 during turning there is a tendency for the dirt to pack against the reinforcing bars. However, it has been discovered that by slotting the front outer side 18 as will be appreciated from FIGS. 2 and 8, wherein a major slot 72 is formed on the outside of the associated reinforcing bar, and a minor slot 74 is located inside of the reinforcing bar that the presence of these slots permits the soil trapped against the reinforcing bars to fall free and render the horseshoe configuration self-cleaning adjacent the bars.

The slot surfaces 76 have a height from the hoof engaging face 14 less than the height of the reinforcing bars 62 and 64 as defined by the surfaces 70, and the slots 72 are outwardly defined by the slot ends 78 while the inner slots 74 are inwardly defined by the terminating slot ends 80.

By way of example, the relationships of the various components described above, dimensionally, may be appreciated. For instance, when forging the blank 10 to form a Size 2 horseshoe the overall length of the blank 10 will be approximately 13 inches, while the width of the body 12 is approximately ¾ of an inch. The height dimension of the grab rib 30 as defined between the apex 38 and the face 14 is ⅜ of an inch, and this is the maximum height dimension of the shoe. The apices 40, 42 and 44 lie within a common plane which is ¼ of an inch from the face 14, and the surface 70 of the reinforcing bars 62 and 64 is 5/16 of an inch from the face 14. The dividing surface 60 is located ⅛ of an inch from the face 14 as is the intersection of the surfaces 46 and 48, and 54 and 56. Accordingly, it will be appreciated from the above dimensions that the vertical height of the grab rib 38 is 50% greater than the vertical height of the ribs 32, 34 and 36.

As will be appreciated from FIGS. 3, 5 and 6, the surface 58 which forms the apex 44 of rib 36 also intersects the body inner side 20, and the dimensions of the body 12 are such that the surface 58 provides additional mass "behind" the rib 36 to support the rib and strengthen the same against deformation.

Forming the blank 10 from its elongated configuration to the C shaped configuration of FIG. 7 is readily accomplished within bending dies, and it will be understood that various sizes of horseshoes will use longer or shorter blanks depending on the desired final configuration. By making the shoe ¾ of an inch wide between sides 18 and 20 the shoe tends to float on soft sandy surfaces, and by using sharp apices on the ribs excellent traction is provided on harder ground. As the reinforcing bars 62 and 64 divide the ground engaging face 16 into three portions, and as the presence of the slots 72 and 74 discourages accumulation of soil adjacent the reinforcing bars, the self-cleaning aspects of the horseshoe assure reduced weight at the horse's hoof, and by maintaining at least a 50° included angle between the ribs the tendency for soil to accumulate between the ribs is reduced. Of course, the spacing provided by the dividing surface 60 is also helpful in this respect. As described above, locating the reinforcing bars 62 and 64 at those locations most likely to deform the horseshoe under lateral forces permits the horseshoe to be strengthened at the most efficient locations without adding significant weight to the shoe.

It is appreciated that various modifications to the inventive concepts may be apparent to those skilled in the art without departing from the spirit and scope of the invention.

I claim:

1. A horseshoe characterized by its light weight, traction and self-cleaning characteristics comprising, in combination, an elongated body having a substantially planar hoof engaging face, an oppositely disposed ground engaging face, a convex outer side having a front central portion, a concave inner side having a rear central portion, a longitudinal axis bisecting said central portions, first, second, third and fourth ribs defined on said ground engaging face extending away from said hoof engaging face spaced between said outer and inner sides, respectively, and substantially extending the length of said body, said ribs being defined by converging surfaces to form sharp radius free apices, the sharp radius free apex of said first rib being defined by the intersection of said outer side and a first converging surface, said second rib having a sharp radius free apex defined by second and third intersecting converging surfaces, said third rib having a sharp radius free apex defined by fourth and fifth converging surfaces, said fourth rib having a sharp radius free apex defined by sixth and seventh converging surfaces, said first and second surfaces and said fifth and sixth surfaces, respectively, intersecting, a flat dividing surface defined on said ground engaging face substantially parallel to said hoof engaging surface, said dividing surface separating said second and third ribs and intersecting with said third and fourth surfaces, said apices of said second, third and fourth ribs being substantially the same distance from said hoof engaging face and a lesser distance therefrom than said apex of said first rib, and nail receiving holes defined in said dividing surface, said first rib apex being spaced from said hoof engaging face a distance approximately 50% greater than the distance of said apices of said second, third and fourth ribs.

2. In a horseshoe as in claim 1, said first and second surfaces, and said fifth and sixth surfaces, respectively, intersecting at a distance from said hoof engaging face substantially equal to the distance of said dividing surface from said hoof engaging face.

3. In a horseshoe as in claim 1, said intersecting first and second surfaces, and said intersecting fifth and sixth intersecting surfaces each defining an included angle greater than 50°.

4. A light weight horseshoe comprising, in combination, an elongated body having a substantially planar hoof engaging face, an oppositely disposed ground engaging face, a convex outer side having a front central portion, a convex inner side having a rear central portion, a longitudinal axis bisecting said central portions, a sharp grab apex defined at the intersection of said outer side and said ground engaging face having a first height dimension, a pair of reinforcing bars defined on said body ground engaging face, said bars being located on opposite sides of said longitudinal axis and each having lateral sides, a front end intersecting said body outer side and a rear end intersecting said body inner side, said bars being generally parallel to each other and said longitudinal axis and reinforcing said body against deformation in the general plane of said hoof engaging face, said bars having a second height dimension less than said grab apex first dimension, clearance slots defined in said body outer side adjacent said bars front ends and lateral sides facilitating self-cleaning of said ground engaging face adjacent said bars, said slots having a third height dimension less than said second height dimension, and nail receiving holes defined in said body.

5. In a light weight horseshoe as in claim 4, a plurality of ribs defined upon ground engaging face intermediate said outer and inner body sides, apices defined on said ribs having a height dimension substantially equal to said slots' third height dimension.

* * * * *